United States Patent [15] 3,660,133
Van Der Schuyt et al. [45] May 2, 1972

[54] PROCESS FOR THE MODIFICATION OF CARBON BLACK

[72] Inventors: Abraham Van Der Schuyt, Hilversum; Kornelis Gerrit Wolthuis, Amsterdam, both of Netherlands

[73] Assignee: Koninklijke Zwavelzuurfabrieken v/h Ketjen N.V.

[22] Filed: May 26, 1969

[21] Appl. No.: 827,896

[30] Foreign Application Priority Data

May 30, 1968 Netherlands............................6807617

[52] U.S. Cl..............................................106/307, 106/20
[51] Int. Cl..............................................C09c 1/44
[58] Field of Search........................................106/307, 308 B

[56] References Cited

UNITED STATES PATENTS

| 3,528,840 | 9/1970 | Aboytes | 106/307 |
| 2,631,107 | 3/1953 | Leatherman | 106/307 |
| 3,333,979 | 8/1967 | Milligan | 106/307 |
| 3,364,048 | 1/1968 | May et al. | 106/307 |
| 3,442,679 | 5/1969 | Rivin | 106/307 |

*Primary Examiner*—James E. Poer
*Assistant Examiner*—H. M. S. Sneed
*Attorney*—Albert C. Johnston, Robert E. Isner, Lewis H. Eslinger and Alvin Sinderbrand

[57] ABSTRACT

Carbon black, in the dry state, is reacted with gaseous sulphur trioxide to increase the ability of the resulting modified carbon black to impart long flow characteristics to printing inks in which it is employed as pigment without increasing the content of volatile substances and without affecting the other pigment properties of the carbon black.

8 Claims, No Drawings

PROCESS FOR THE MODIFICATION OF CARBON BLACK

This invention relates generally to the modification of carbon black for improving the ink-pigment properties thereof, and more particularly for improving the flow or "length" of the ink into which the carbon black is worked.

It is known to employ carbon black as black pigment in inks.

The carbon black thus employed must be readily dispersible in the ink mixture and impart good blackness, covering power and flow to the ink. Carbon blacks which are able to impart these properties to ink are characterised by a small particle size (of the order of magnitude of 15 to 3 m$\mu$), a comparatively small surface area (25 to 125m$^2$/g) and a low oil absorption factor (0.5 to 1.2 cm$^3$ of oil per gram of carbon black). Such carbon blacks usually have a so-called "low" structure. It is known that these pigment properties of the carbon black can be regulated to a greater or lesser extent by selection of one or the other of the prior art processes by which carbon black is prepared and, in a particular process, by the choice of the reaction conditions. Methods have already been proposed in which, by an after-treatment of the carbon black with, for example, oxidizing agents, certain ink pigment properties can be improved.

In inks with a high carbon black content (up to 20 to 25 percent by weight), which are used, for example, for book printing and offset printing, the "flow" property is of very great importance. Channel blacks are in general use for this purpose as so-called "long-flow" pigments. Furnace blacks, as such, are not suitable for this purpose, since, especially in the case of higher pigment concentrations, they are inadequate in their ability to give these inks sufficient flow. Although the cause of this difference in behavior between channel and furnace blacks is still not fully understood, it has been supposed that this difference must be connected with the content of volatile substances in the different kinds of carbon black. The content of volatile substances determines the amount of oxygen and/or other gases physically and/or chemically combined at the surface, and the percentage weight reduction of dried carbon black upon heating at 925° C for 7 minutes is a measure of the content of volatile substances. Channel blacks have a content of volatile constituents of at least 5 percent, by weight; whereas the volatile content of furnace blacks is, at the most 1 percent, by weight.

In view of the fact that the channel process is economically unattractive, since merely a part of the starting material is converted into black, a diligent search has been made for methods of raising the volatile substances content of furnace blacks by means of an after-treatment. There have already been proposed a number of after-treatments which consist essentially in oxidizing the furnace black at the surface thereof with, for example, oxygen, ozone, nitrogen oxides and/or nitric acid. A disadvantage of the oxidative after-treatment with oxygen is that, in such process, a part of the black is lost. Oxidative after-treatment with ozone is rather costly. A difficulty of oxidation in the wet phase with nitric acid is that, in such case, the dispersibility of the pigment is impaired, since a wet-phase process always yields a more or less granular product. This makes grinding of the after-treated pigment necessary, for example in a jet mill, in order to again obtain acceptable dispersibility.

In all known oxidative after-treatments for converting a carbon black into a "long-flow" pigment, it is considered necessary to increase the content of volatile constituents to at least 2 percent by weight, which requires an excess of oxidizing agent and/or long reaction times. For use in offset and book printing inks, the content of volatile substances must even be increased to more than 10 percent by weight (see: Kirk-Othmer's Encyclopedia of Chemical Technology, 2nd impression (1964), Vol. 4, pp. 275–276, and in particular p. 276, lines 2 and 3).

It has now been found that the ability of carbon blacks to give inks the desired long flow, while retaining the other desired pigment properties and without substantially increasing the content of volatile substances, can be very markedly increased by reacting the carbon black in the dry state with gaseous sulphur trioxide. In this after-treatment, there is no loss whatsoever of the material.

The present process has proved to be valuable, in particular, for the treatment of furnace blacks, which blacks, especially when used in high concentrations in ink, as is usual in book-printing and offset inks, impart no flow or practically no flow to inks. However, the process according to this invention can be applied advantageously to other kinds of carbon black, such as carbon black which has a comparatively high content of volatile substances, for instance channel black, or to furnace black which has already been after-treated oxidatively, in which cases the ability of such blacks to give flow to ink can be further increased substantially. The process also can be applied advantageously to carbon blacks which have been obtained with the aid of a so-called "high energy" burner.

In the present process the volatile substances content of the carbon black is only slightly increased, while the ability to give ink flow after the SO$_3$ treatment is comparable with or even greater than the "flow" capacity of carbon blacks with a volatile substances content of 5 percent or more by weight. Thus, in respect of "flow capacity", carbon black treated with SO$_3$ according to this invention differs essentially from furnace blacks which have been after-treated oxidatively.

The temperature at which the carbon black is reacted with SO$_3$ may be varied within wide limits. The SO$_3$ reacts with the carbon black even at room temperature. At higher temperatures, the reaction time is substantially shortened. Above 300° C, however, decomposition of the end product into the starting materials occurs. In practice, a temperature between 100° and 300° C appears to be very satisfactory, the preferance being for a temperature of about 200° C.

The carbon black is dried prior to reaction with SO$_3$ to a moisture content, determined with Karl Fischer reagent, of less than 0.1 percent by weight. This drying may be effected, for example, by heating the black to a temperature between 120° and 200° C for a short time.

Reacting the carbon black with even small amounts of sulphur trioxide, for example 0.05 g. of SO$_3$ per 100 g. of black, achieves an appreciable effect. In many cases, the reaction of as little as 0.1 g of SO$_3$ with each 100 g of black proves to be sufficient for obtaining the desired improvement in flow capacity. The pH of the black is lowered by the SO$_3$ treatment, and thus, the maximum amount of SO$_3$ to be used is dependent upon the lower limit of pH of the treated black that is permissible. The pH of furnace blacks, which is usually above 7, is lowered to below 6 by the SO$_3$ treatment. The majority of other ink blacks, including furnace blacks which have been after-treated oxidatively, have a pH which is between 3 and 4.5. The amount of SO$_3$ reacted with the black according to the present process is chosen so that the pH of the treated black is brought to a value between 2 and 6 and preferably between 2.5 and 5. A pH below 2 is considered inadmissible for an ink pigment, so that the amount of SO$_3$ which is reacted with the black is preferably not above 2 g per 100 g of black.

The desired amount of sulphur trioxide may be reacted with the carbon black in various ways. For example, in a batch process, the desired amount of gaseous sulphur trioxide may be passed into a quantity of black, at room temperature, and then the temperature is increased, for example, to 180° C, while the black is continuously stirred. With small amounts of SO$_3$, a contact time of 5 to 10 minutes at the reaction temperature is sufficient to cause the sulphur trioxide to react fully. With larger amounts of SO$_3$, it may be desirable to increase the contact time to 30 minutes. Alternatively, the black may first be brought to the reaction temperature, after which gaseous SO$_3$ is passed into the black while stirring. In practice, this last procedure is preferred, and in this case, the SO$_3$ may be advantageously passed into the carbon black with the aid of a carrier gas, for instance nitrogen or air. Oleum may serve as the source of SO$_3$ with nitrogen, for example, being passed therethrough, so that SO$_3$ is entrained by the stream of nitrogen. The supply of $SO_3$ and nitrogen to the reaction vessel, is stopped as soon as the desired amount of $SO_3$ has been introduced. Thereafter, the reaction is continued for some time longer (30 minutes at the most) while stirring. After the carbon black has been cooled, it is immediately suitable for being worked up into ink.

In determining the amount of $SO_3$ to be introduced, the pH of the carbon black can be used as an indicator by drawing samples of the black during the reaction, determining the pH thereof and stopping the supply of $SO_3$ at that instant when a specific pH is reached, after which the reaction may be continued for some time longer.

If desired, the pH of the treated carbon black can be increased with the aid of gaseous ammonia to 6 or more, up to a maximum of 9.0, without adversely affecting the ability of the treated black to impart a good flow to the ink.

It has also been found possible, if too much $SO_3$ has been supplied, to correct the resulting too low pH by heating the treated carbon black to a temperature above 300° C, up to a maximum of 390° C, for some time (for example, 5 to 10 minutes) while stirring and passing nitrogen therethrough, during which treatment part of the $SO_3$ is expelled. An increase in the pH can also be effected by mixing the treated carbon black with untreated carbon black and stirring this mixture for some time at a temperature between 100° and 300° C, for example at 180° C. Although it is possible to expel $SO_3$ in this way it should be noted, that the modified carbon black is not a carbon black onto which $SO_3$ is adsorbed but is a carbon black with chemically and/or strongly physically bound $SO_3$. The $SO_3$ cannot be removed by washing operations with water.

Although the starting material for the present process is preferably pulverulent (fluffy) carbon black, as results from the process for preparing carbon black, the process according to the invention can also be applied to pelletized carbon black.

It will be apparent that the process according to the invention is not limited to batch type operations, but can also be carried out continuously by, for instance, conveying carbon black and $SO_3$-charged nitrogen continuously through a rotating drum which is kept at the reaction temperature, the drum being, for example, located a such an angle to the horizontal plane that the time during which the carbon black remains at the reaction temperature is sufficient to cause the $SO_3$ to react fully with the black.

The invention will now be further illustrated with reference to the following non-limitative examples thereof.

Example I

A furnace black with a low structure (CR type) was dried to a moisture content (determined by the Karl Fischer method) of less than 0.1 percent by weight. 100 g of this dried furnace black was heated in a receiver to 180° C while stirring. 2 liters of nitrogen, in which 0.1 g of sulphur trioxide was taken up, were passed through the heated carbon black at a rate of 1 liter per minute while stirring continuously. The gas flowing out did not contain any $SO_3$. The reaction mixture was thereafter stirred for another 20 minutes while heated to the indicated temperature. It was apparent that the sulphur trioxide had reacted fully with the carbon black. The treated carbon black did not smell of $SO_3$. Table A below gives data as to indicated characteristics of the treated carbon black and the starting carbon black.

TABLE A

| | Starting carbon black (CR type) | Treated carbon black |
|---|---|---|
| $N_2$ area in m.²/g. by the B.E.T. method | 80 | 80 |
| Oil absorption in cm.³/g. | 0.80 | 0.80 |
| Content of volatile substances in % by weight | 0.6 | 0.7 |
| pH | 9.0 | 4.0 |
| Flow of the ink in cm. (5 parts of pigment in 25 parts of quick-set varnish) | 0 | 30 |
| Dispersion after: | | |
| 1 grinding operation | 20μ | 20μ |
| 2 grinding operations | 8μ | 8μ |
| 4 grinding operations | <3μ | <3μ |

The commercially available ink carbon black Regal 400 R (a product of Cabot Corporation), which has a surface area of 95 m²/g, an oil absorption of 0.75 ml/g and a volatile substances content of 2.5 percent by weight, was found to have an ink flow of 24.2 cm by the same flow test.

In Table A above:

The "oil absorption" of the carbon black is the number of cm³ of oil per gram of carbon black that is necessary as a minimum to form a stiff paste with the black;

The "content of volatile substances" is the percentage decrease in weight of dry carbon black resulting from heating to 950° C for 7 minutes under such conditions that no oxidation of the black occurs; and By the "pH" of carbon black there is meant the pH of a mixture of carbon black and distilled water obtained by stirring 1 g of carbon black in 75 cm³ of water for 2 minutes.

Further, the "flow of the ink" into which the carbon black was worked as pigment was determined by the following standard procedure:

An ink was made from the pigment by mixing a number of parts of pigment into a number of parts of quick-set varnish in a three-roll mill. The ink was put through the three-roll mill four times; the dispersion was then satisfactory. Immediately after preparation, 0.5 cm³ of this ink was transferred with an ink pipette (I.G.T.) to a flow meter consisting of a thick rectangular glass plate in which a number of openings having the form of a hemisphere and a capacity of 0.5 cm³ were arranged in the vicinity of one short side. These openings were filled with the ink while the plate was held horizontal. The plate was thereafter held in this position for another 20 hours and was afterwards placed at an angle of 80° to the horizontal plane with the ink-filled openings at the top. After 10 minutes, the length of the streak of ink produced was measured. This length, expressed in cm, is a measure of the flow of the ink.

The "dispersion" of the carbon black in the ink was determined after one, two and four grinding operations on a three-roll ink mill with the NPIRI-Grindo meter or ink-fineness meter in accordance with the NPIRI Standard Test Methods 1949/1955 - D1. The "Grindo" meter consists of an oblong metal block in which there is arranged, in the lengthwise direction, a wide groove which gradually becomes deeper and along which there is a scale for the depth of the groove, running from 0 - 25 microns. Into the deepest part of the groove there is introduced a drop of ink which projects above the groove. The ink is moved along through the groove in the direction of decreasing depth by means of a special scraper. Grains of pigment having a diameter greater than the depth of the groove at a specific point will be broken up by the scraper. A streak pattern is created in the groove. The point on the scale at which such streaks begin indicates the upper limit of the diameter of the grains of pigment in the ink. This reading, expressed in microns, is a measure of the dispersion of the carbon black and at the same time a measure of the dispersibility of the carbon black in the ink.

Example II 100 g of the same carbon black as was used as the starting material in Example I were heated to 180° C in a receiver while stirring. 7.5 liters of nitrogen, in which 1.0 g of sulphur trioxide was taken up, were passed through the carbon black at a rate of 1.5 liters per minute while stirring the black continuously. The gas flowing out did not contain any $SO_3$. After the sulphur trioxide-containing nitrogen had been passed therethrough, the carbon black was maintained at the temperature of 180° C for another 5 minutes. A portion of the thus treated black was brought to a pH of 7.0 by passing ammonia gas therethrough at 180° C. Table B below gives data as to the indicated characteristics of the treated carbon blacks and the starting carbon black.

TABLE B

|  | Starting carbon black (CR type) | Treated carbon black | Treated carbon black, neutralized with ammonia |
|---|---|---|---|
| $N_2$ area in m.$^2$/g. by the B.E.T. method | 80 | 80 | 80 |
| Oil absorption in cm.$^3$/g. | 0.8 | 0.8 | 0.8 |
| Content of volatile substances in % by weight | 0.6 | 0.9 | 0.9 |
| pH | 9.0 | 3.0 | 7.0 |
| Flow of the ink in cm. (5 parts of pigment in 25 parts of quick-set varnish) | 0 | 40 | 25 |
| Dispersion after: |  |  |  |
| 1 grinding operation | 20μ | 20μ | 20μ |
| 2 grinding operations | 8μ | 8μ | 8μ |
| 4 grinding operations | <3μ | <3μ | <3μ |

Example III 15 liters of nitrogen in which 2.0 g of sulphur trioxide were taken up were passed at a rate of 1.5 liters per minute through 100 g of the same carbon black as was used as the starting material in Example I at 180° C while stirring. The gas flowing out contained practically no $SO_3$. A sample of the carbon black treated in this way was found to have a pH of 2.0, which is regarded as undesirable for use as ink pigment in certain cases. The treated carbon black was thereafter heated for 10 minutes to a temperature of 390° C while passing nitrogen therethrough at the rate of 1.5 liters per minute and stirring. Following this after-treatment, the pH of the black was found to have risen to 3.0 and the remaining properties of the black were found to be similar to those of the treated carbon black in Example I.

This Example illustrates that, if desired, corrections can be carried out if an excess supply of $SO_3$ has been employed to cause the carbon black to acquire too low a pH.

Example IV

A dry-granulated furnace black (SAF type, a carbon black with a high structure) was dried to a moisture content of less than 0.1 percent by weight. 10 liters of nitrogen, in which 1.0 g of $SO_3$ was taken up, were passed at a rate of 1 liter per minute, through 100 g of this dried carbon black at 180° C while stirring. The black was thereafter stirred for another 30 minutes at 180° C. Table C below gives data as to the indicated characteristics of the product obtained and the starting carbon black.

TABLE C

|  | Starting carbon black (SAF furnace black) | Treated carbon black |
|---|---|---|
| $N_2$ area in m.$^2$/g. by the B.E.T. method | 125 | 125 |
| Oil absorption in cm.$^3$/g. | 1.18 | 1.18 |
| Content of volatile substances in % by weight | 0.6 | 1.0 |
| pH | 9.0 | 3.0 |
| Flow of the ink in cm. (3.5 parts of pigment in 25 parts of quick-set varnish) | 0 | 29 |
| Dispersion after: |  |  |
| 1 grinding operation | 25μ | 25μ |
| 2 grinding operations | 12μ | 12μ |
| 4 grinding operations | <3μ | <3μ |

Example V 1.5 liters of nitrogen, in which 0.15 g of sulphur trioxide was taken up, were passed at a rate of 1 liter per minute, through 100 g of dry channel black (Spheron 9, a carbon black produced by Cabot Corporation) at 180° C while stirring. The black was thereafter heated for another 30 minutes at 180° C while stirring. The black obtained was tested in ink. Properties of the carbon black thus obtained are compared with the corresponding properties of the starting carbon black in Table D below.

TABLE D

|  | Starting carbon black (Spheron 9) | Treated carbon black |
|---|---|---|
| $N_2$ area in m.$^2$/g. by the B.E.T. method | 105 | 105 |
| Oil absorption in cm.$^3$/g. | 1.10 | 1.10 |
| Content of volatile substances in % by weight | 5.0 | 5.1 |
| pH | 5.0 | 4.0 |
| Flow of the ink in cm. (1.5 parts of pigment in 25 parts of quick-set varnish) | 23 cm. | 32 cm. |
| Dispersion after: |  |  |
| 1 grinding operation | 20μ | 20μ |
| 2 grinding operations | 8μ | 8μ |
| 4 grinding operations | <3μ | <3μ |

It is also evident from this Example that the flow capacity of an ink carbon black that is renowned for its ability to give flow to ink is considerably improved by the $SO_3$ treatment.

Example VI

In this Example, the starting material was the carbon black which is liberated in the preparation of acetylene (LTD 237 produced by Chemische Werke Huls).

3 liters of nitrogen, in which 0.3 g of $SO_3$ was taken up, were passed through 100 g of such dried carbon black at 180° C at a rate of 1 liter per minute, while stirring. The black was thereafter stirred for another 30 minutes at 180° C. Properties of the carbon black thus obtained are compared with the corresponding properties of the starting carbon black in Table E below.

TABLE E

|  | Starting carbon black (LTD 237) | Treated carbon black |
|---|---|---|
| $N_2$ area in m.$^2$/g. by the B.E.T. method | 66 | 66 |
| Oil absorption in cm.$^3$/g. | 1.48 | 1.48 |
| Content of volatile substances in % by weight | 3.2 | 3.3 |
| pH | 6.5 | 4.3 |
| Flow of the ink in cm. (3.0 parts of pigment in 25 parts of quick-set varnish) | 0 | 18 |
| Dispersion after: |  |  |
| 1 grinding operation | 20μ | 20μ |
| 2 grinding operations | 8μ | 8μ |
| 4 grinding operations | <3μ | <3μ |

Example VII

A dry-granulated furnace black (CR type with a low structure) was dried to a moisture content of less than 0.1 percent by weight. 2.5 liters of nitrogen, in which 0.25 g of $SO_3$ was taken up, were passed through 100 g of this dried carbon black at 240° C, at a rate of 1 liter per minute, while stirring. The black was thereafter stirred for another 15 minutes at 240° C. Properties of the carbon black thus obtained are compared with the corresponding properties of the starting carbon black in Table F below.

TABLE F

|  | Starting carbon black (CR type) | Treated carbon black |
|---|---|---|
| $N_2$ area in m.$^2$/g. by the B.E.T. method | 80 | 80 |
| Oil absorption in cm.$^3$/g. | 0.8 | 0.8 |
| Content of volatile substances in % by weight | 0.6 | 0.8 |

| | | |
|---|---|---|
| pH | 9.0 | 3.7 |
| Flow of the ink in cm. (5 parts of pigment in 25 parts of quick-set varnish) | 0 | 30 |
| Dispersion after: | | |
| 1 grinding operation | 20μ | 20μ |
| 2 grinding operations | 8μ | 8μ |
| 4 grinding operations | <3μ | <3μ |

It is also evident from this Example that a carbon black which, when worked into ink in a weight ratio of pigment to varnish of 1 to 4, does not give the ink any flow, gives the ink an excellent flow after the $SO_3$ treatment according to this invention even though the pigment to varnish weight ratio is unchanged.

Example VIII

A dry-granulated furnace black (CR type with a low structure) was dried to a moisture content of less than 0.1 percent by weight. 2 liters of nitrogen, in which 0.2 g of $SO_3$ was taken up, were passed through 100 g of this dried carbon black at 120° C, at a rate of 1 liter per minute, while stirring. The black was thereafter stirred for another 15 minutes at 120° C. Properties of the carbon black thus obtained are compared with the corresponding properties of the starting carbon black in Table G below.

TABLE G

| | Starting carbon black (CR type) | Treated carbon black |
|---|---|---|
| $N_2$ area in m.²/g. by the B.E.T. method | 80 | 80 |
| Oil absorption in cm.³g. | 0.8 | 0.8 |
| Content of volatile substances in % by weight | 0.6 | 0.8 |
| pH | 9.0 | 3.3 |
| Flow of the ink in cm. (5 parts of pigment in 25 parts of quick-set varnish) | 0 | 40 |
| Dispersion after: | | |
| 1 grinding operation | 20μ | 20μ |
| 2 grinding operations | 8μ | 8μ |
| 4 grinding operations | <3μ | <3μ |

It is apparent from this Example that a good result can be obtained with the present process even when the reaction of the sulphur trioxide with the carbon black is conducted at 120° C.

What is claimed is:

1. Process for increasing the ability of carbon black to impart long flow characteristics to printing inks while avoiding substantial increases in the volatile substances content of such carbon black, comprising contacting carbon black, in the dry state, with an amount of gaseous sulphur trioxide between 0.05 and 2.0 percent of the weight of said carbon black at a temperature between 100° and 300° C. and for a period of 1 to 30 minutes so as to provide the reaction product with a pH in the range between 2 and 6.

2. The process according to claim 1, in which the carbon black to be reacted with the sulphur trioxide has a moisture content of less than 0.1 percent by weight.

3. The process according to claim 1, in which the carbon black and sulphur trioxide are initially brought into contact with each other at room temperature, and the reaction between the carbon black and the sulphur trioxide is promoted by then heating the contacting carbon black and sulphur trioxide to said temperature.

4. The process according to claim 1, in which the carbon black is heated to said temperature, and said sulphur trioxide is passed into contact with the thus heated carbon black with the aid of a carrier gas.

5. The process according to claim 1, in which said amount of sulphur trioxide is selected to provide said reaction product with a pH in the range between 2.5 and 5.

6. The process according to claim 1, in which the treated carbon black which is the product of the reaction of sulphur trioxide with carbon black has its pH adjusted by heating said treated carbon black to a temperature above 300° C. and passing therethrough a gas selected from the group consisting of air and nitrogen.

7. The process according to claim 1, in which the treated carbon black which is the product of the reaction of sulphur trioxide with the starting carbon black has its pH adjusted by heating said treated carbon black with a quantity of said starting carbon black to a temperature in the range between 100° and 300° C.

8. The process according to claim 1, in which the treated carbon black which is the product of the reaction of sulphur trioxide with carbon black has its pH increased by contacting the same with $NH_3$.

* * * * *